(12) United States Patent
Hara (10) Patent No.: US 9,065,956 B2
(45) Date of Patent: Jun. 23, 2015

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Kenji Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/186,898

(22) Filed: Feb. 21, 2014

(65) Prior Publication Data

US 2014/0240742 A1 Aug. 28, 2014

(30) Foreign Application Priority Data

Feb. 25, 2013 (JP) ................................. 2013-034920

(51) Int. Cl.
*G06F 3/12* (2006.01)
*H04N 1/00* (2006.01)
*G06K 15/00* (2006.01)
*G03G 15/00* (2006.01)

(52) U.S. Cl.
CPC ........ *H04N 1/00904* (2013.01); *G06K 15/4055* (2013.01); *H04N 1/00891* (2013.01); *G03G 15/50* (2013.01); *G03G 15/5004* (2013.01); *G03G 2215/00126* (2013.01)

(58) Field of Classification Search
None
See application file for complete search history.

(56) References Cited

U.S. PATENT DOCUMENTS

| 6,906,813 | B1 * | 6/2005 | Tuchitoi et al. | 358/1.14 |
| 7,929,173 | B2 * | 4/2011 | Tuchitoi et al. | 358/1.16 |
| 8,836,965 | B2 * | 9/2014 | Yamada et al. | 358/1.14 |
| 2005/0141030 | A1 * | 6/2005 | Tuchitoi et al. | 358/1.16 |
| 2006/0017960 | A1 * | 1/2006 | Kakigi | 358/1.14 |
| 2007/0109586 | A1 * | 5/2007 | Yamada et al. | 358/1.14 |

FOREIGN PATENT DOCUMENTS

| JP | 7-168704 A | 7/1995 |
| JP | 2001-201986 A | 7/2001 |

* cited by examiner

*Primary Examiner* — Marcus T Riley
(74) *Attorney, Agent, or Firm* — Canon USA Inc. IP Division

(57) ABSTRACT

An information processing apparatus includes a plurality of processing units configured to perform different types of processing, a power supply unit configured to supply power to any of the processing units, a job storage unit configured to store a first job, a second job, which is received after the first job, and a third job, which is received after the second job, and a control unit configured to perform control, if the second job is not executable and the third job is executable in a power state to be shifted for executing the first job, to execute the third job after the first job and to execute the second job after the third job.

9 Claims, 5 Drawing Sheets

| | JOB TYPE | PRINTER UNIT POWER | SCANNER UNIT POWER | GENERAL IMAGE PROCESSING UNIT POWER |
|---|---|---|---|---|
| 201 | PDL PRINT | ON | — | ON |
| 202 | FAX TRANSFER | — | — | ON |
| 203 | FAX RECEPTION PRINT | ON | — | ON |
| 204 | FAX MEMORY RECEPTION | — | — | ON |
| 205 | FAX SCAN | — | ON | ON |
| 206 | COPY | ON | ON | — |

| JOB TYPE | PRINTER UNIT POWER 19 | SCANNER UNIT POWER 20 | GENERAL IMAGE PROCESSING UNIT POWER 21 |
|---|---|---|---|
| 201 PDL PRINT | ON | — | ON |
| 202 FAX TRANSFER | — | — | ON |
| 203 FAX RECEPTION PRINT | ON | — | ON |
| 204 FAX MEMORY RECEPTION | — | — | ON |
| 205 FAX SCAN | — | ON | ON |
| 206 COPY | ON | ON | — |

INFORMATION PROCESSING APPARATUS AND CONTROL METHOD FOR INFORMATION PROCESSING APPARATUS

BACKGROUND OF THE INVENTION

1. Field of the Invention

The present invention relates to an information processing apparatus and a control method for the information processing apparatus.

2. Description of the Related Art

In recent years, an information processing apparatus used in an office environment is expected to have a higher power-saving effect. The information processing apparatus is, for example, an image forming apparatus.

Japanese Patent Application Laid-Open No. 2001-201986 discusses an image forming apparatus capable of reducing effective power by turning on and off its power and by shifting to a power-saving mode. In addition, the image forming apparatus is capable of further reducing the effective power by turning off the power for devices that are not used even in the standby state.

On the other hand, an image forming apparatus for executing multiple function processing receives a plurality of jobs simultaneously. Thus, it is desirable that the image forming apparatus should efficiently execute the plurality of jobs. For example, Japanese Patent Application Laid-Open No. 7-168704 discusses a job execution control method. This method automatically controls an execution order of a plurality of related jobs by selecting a second related job according to an execution result of a first related job.

In an image forming apparatus, power supply to a device, such as a printer and a scanner, can be turned on when the device is used and be turned off immediately after finishing the use of the device to achieve a high power-saving effect.

However, in the device including, for example, a relay in which the number of ON/OFF times of power is predetermined, there is a possibility that a device failure may occur due to ON/OFF of the power each time the device is used. That is, once the power is turned on, such a power-on state should be maintained as long as possible to deal with a risk of exceeding the predetermined number of ON/OFF times of the power.

Moreover, the device may consume time for initialization after the power is turned on. In such a case, once the power is turned off, the initialization takes time when the power is turned on next time. That is, an energization time is extended for a period of the initialization. This lowers user responsiveness as well as an electrical performance. Thus, once the device is energized, such an energized state should be maintained.

The energized state of the device needs to be maintained, while the power needs to be turned off when the device is not in use. These two contradicted demands need to be simultaneously solved.

SUMMARY OF THE INVENTION

The present invention is directed to a configuration capable of executing jobs in order of priority such that the number of ON/OFF times of power for each processing unit is minimized.

According to an aspect of the present invention, an information processing apparatus includes a plurality of processing units configured to perform different types of processing, a power supply unit configured to supply power to any of the processing units, a job storage unit configured to store a first job, a second job, which is received after the first job, and a third job, which is received after the second job, and a control unit configured to perform control, if the second job is not executable and the third job is executable in a power state to be shifted for executing the first job, to execute the third job after the first job and to execute the second job after the third job.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
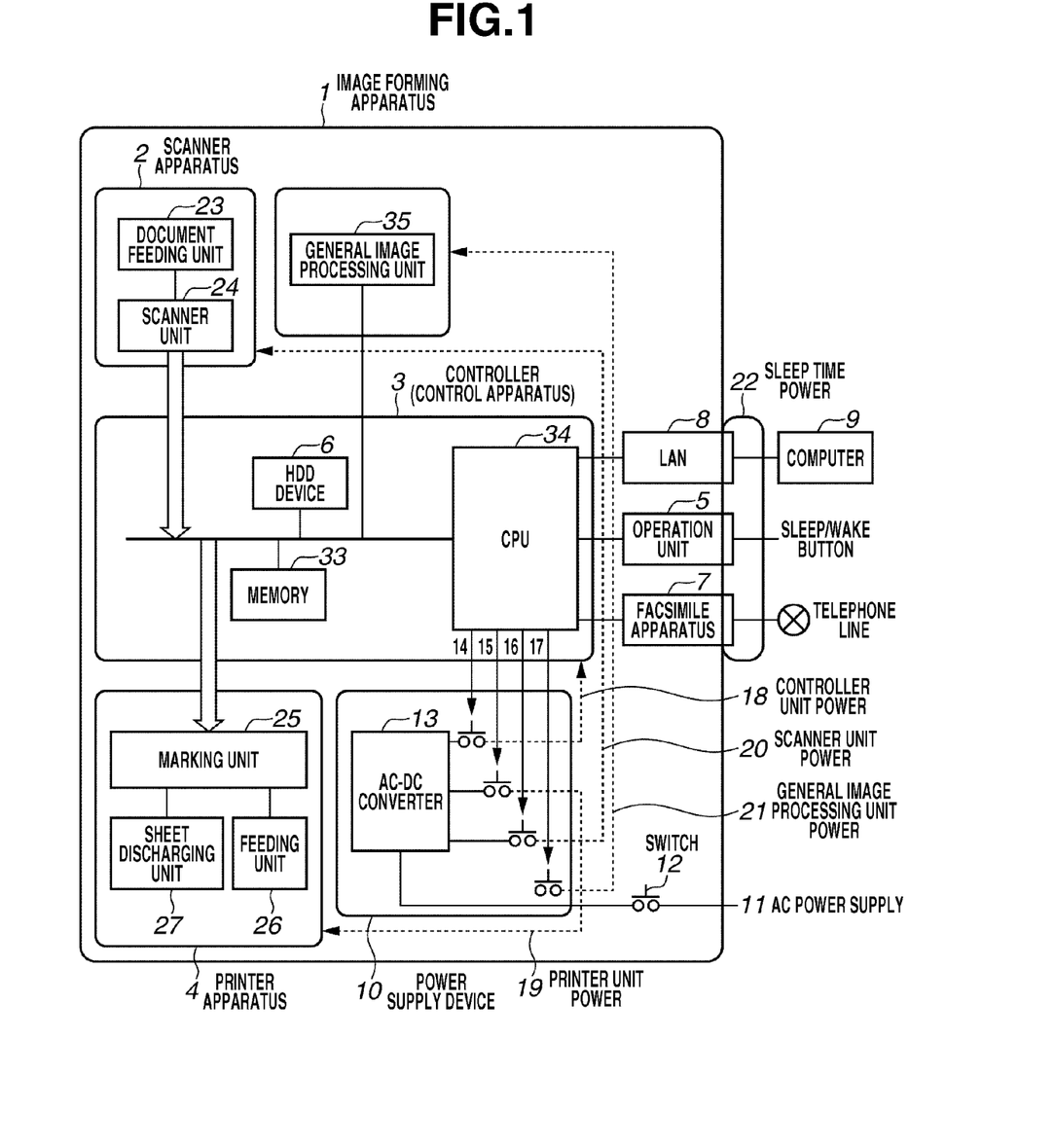
FIG. 1 is a block diagram illustrating an example of an image forming apparatus.

FIG. 1 is a block diagram illustrating an example of an image forming apparatus 1 using an information processing apparatus according to a first exemplary embodiment. In the present exemplary embodiment, a controller 3 controls a scanner apparatus 2, a printer apparatus 4, and a facsimile (FAX) apparatus 7 according to a type of received job. Such a configuration enables the image forming apparatus 1 to execute multiple functions processing. Specifically, jobs such as a print job, a scan job, a transmission job, and a copy job can be performed. That is, the image forming apparatus 1 using the information processing apparatus according to the present exemplary embodiment includes a print unit, a scanner unit, and an image processing unit serving as a plurality of processing units.

In the image forming apparatus 1 illustrated in FIG. 1, the scanner apparatus 2 optically reads an image from a document, and converts the image into a digital image. The printer apparatus 4 outputs a digital image to a sheet medium. An operation unit 5 includes keys used to operate the image forming apparatus 1, and a display unit including a liquid crystal display (LCD). The LCD can be used as a touch panel.

A hard disk drive (HDD) device 6 stores, for example, digital images and control programs. The FAX apparatus 7 transmits a digital image to a telephone line. In the present exemplary embodiment, the HDD device 6 is used as a job storage device for storing jobs in order of reception. The HDD device 6 is also used as a storage device for storing a table illustrated in FIG. 2. The controller 3 executes a job on the image forming apparatus 1 by providing an instruction to each module connected to the scanner apparatus 2, the printer apparatus 4, the operation unit 5, and the HDD device 6.

The image forming apparatus 1 can input and output digital images from and to a computer 9 via a local area network (LAN) 8. Moreover, the image forming apparatus 1 can issue a job and provide an instruction to a device.

The scanner apparatus 2 includes a document feeding unit 23 and a scanner unit 24. The document feeding unit 23 can automatically and successively feed a bundle of document sheets. The scanner unit 24 can optically scan an image on a document, and convert the scanned image into a digital image. The scanner apparatus 2 transmits converted image data to the controller 3.

The printer apparatus 4 includes a feeding unit 26, a marking unit 25, and a sheet discharging unit 27. The feeding unit 26 can successively feed sheets one by one from a sheet bundle, and the marking unit 25 is used to print image data on the sheet fed from the feeding unit 26. The sheet discharging unit 27 discharges the sheet after the image data is printed.

The controller 3 includes a central processing unit (CPU) 34. The controller 3 exchanges an image with the scanner apparatus 2 and the printer apparatus 4, and performs storing operation for the image. In the controller 3, that is, the digital image received from the scanner apparatus 2 is temporarily stored in a memory 33. The image is then stored in the HDD device 6, thereby completing scanning and storing the image.

The controller 3 temporarily stores the image data from the HDD device 6 to the memory 33, and provides the digital image from the memory 33 to the printer apparatus 4 to print out the image.

A general image processing unit 35, for example, reduces the image data stored in the memory 33, and stores the reduced image data in the memory 33 again. The general image processing unit 35 is used in various situations as necessary.

The image forming apparatus 1 includes the operation unit 5 controlled by the controller 3. With interpretation of an operation of an operator or an instruction from the LAN 8 by the CPU 34, the image forming apparatus 1 can execute various jobs. Examples of the jobs are described below.

(Copy Function)

The image forming apparatus 1 stores an image read from the scanner apparatus 2 in the HDD device 6. Simultaneously, the image forming apparatus 1 prints the image using the printer apparatus 4.

(Image Transmission Function)

The image forming apparatus 1 transmits an image read from the scanner apparatus 2 to the computer 9 via the LAN 8.

(Image Storage Function)

The image forming apparatus 1 stores an image read from the scanner apparatus 2 in the HDD device 6, and transmits and prints the image as necessary.

(Image Printing Function)

The image forming apparatus 1 analyzes, for example, page description language data transmitted from the computer 9, and prints the analyzed data using the printer apparatus 4.

(FAX Reception Print)

The image forming apparatus 1 stores a FAX image received from the FAX apparatus 7 in the HDD device 6. Simultaneously, the image forming apparatus 1 prints the FAX image using the printer apparatus 4.

(FAX Transfer Processing)

The image forming apparatus 1 stores a FAX image received from the FAX apparatus 7 in the HDD device 6. Simultaneously, the image forming apparatus 1 transfers the FAX image to the computer 9 via the LAN 8.

(FAX Memory Reception Processing)

The image forming apparatus 1 stores a FAX image received from the facsimile apparatus 7 in the HDD device 6, and waits for an operator to view the FAX image.

(FAX Transmission Processing)

The image forming apparatus 1 stores an image read from the scanner apparatus 2 in the HDD device 6. Simultaneously, the image forming apparatus 1 transmits the image to a public line via the facsimile apparatus 7.

The HDD device 6 is interposed in most of above-described cases. In this way, the image forming apparatus 1 can recover from a job failure and an abnormal situation, such as power interruption. A power supply device 10 supplies power to each unit in the image forming apparatus 1. When the image forming apparatus 1 is in an OFF state, an alternating current (AC) power supply 11 is insulated by a switch 12. When the switch 12 is turned on, an AC power is supplied to an alternating current direct current (AC-DC) converter 13, and a DC power is generated.

Moreover, the image forming apparatus 1 can control the entire apparatus thereof with four independent power supplies according to instructions of the CPU 34. That is, the CPU 34 can control ON/OFF of a power supply of a controller unit power 18 by operating a switch 14. Similarly, a switch 15, a switch 16, and a switch 17 are used for controlling ON/OFF of power supplies of a printer unit power 19, a scanner unit power 20, and a general image processing unit power 21, respectively. The CPU 34 uses these switches to turn on the power supply to a necessary device of the image forming apparatus 1.

(Sleep State)

A sleep state represents a power state in which power consumption of the image forming apparatus 1 is reduced as low as possible. The CPU 34 causes a peripheral device to be in a general suspend state (e.g., an advanced configuration and power interface (ACPI)-S3). Meanwhile, the CPU 34 causes only a job detectable portion (a sleep time power 22) to be in an energized state. Accordingly, the entire image forming apparatus 1 can be in a very low power consumption state.

Specifically, the CPU 34 stores a state of the image forming apparatus 1 in the memory 33, and turns off a power supply of the controller unit power 18 including power thereof by the switch 14. In such a state, the CPU 34 stops the operation thereof, whereas a power supply of the sleep time power 22 is turned on as hardware, so that the CPU 34 recognizes only job reception. For example, when a job is received via the LAN 8, the FAX apparatus 7 by incoming call, and the operation unit 5 by operator's operation, the controller unit power 18 is turned on as hardware.

The CPU 34 reads out the state of the image forming apparatus 1 stored in the memory 33. Then, the CPU 34 performs resetting to cause the image forming apparatus 1 to return to a state immediately before the power supply of the controller unit power 18 is turned off, and the image forming apparatus 1 shifts to a standby state. Since most of the hardware cannot operate in the sleep state, only shifting to the standby state is performed. After the image forming apparatus 1 is shifted to the standby state, a job is received.

(Standby State)

A standby state represents a power state in which the controller unit power 18 is being in an energized state.

The image forming apparatus 1 receives an operator's operation through the operation unit 5, and a job via the LAN 8.

Since the printer unit power 19, the scanner unit power 20, and the general image processing unit power 21 are being turned off, the CPU 34 turns on power supplies to the devices to be used by using the switches 15, 16, and 17, thereby executing a prescribed job. For example, the CPU 34 turns on a power supply to the device according to a job type as described below.

(Copy Function)

The CPU 34 turns on the scanner unit power 20 and the printer unit power 19, so that the above-described copy function is performed.

(Image Transmission Function)

The CPU 34 turns on only the scanner unit power 20, and a read digital image is transmitted.

(Image Storage Function)

The CPU 34 turns on only the scanner unit power 20, and a read digital image is stored.

(Image Printing Function)

The CPU 34 turns on only the printer unit power 19, and various digital images are printed.

(Fax Reception Print)

The CPU 34 turns on the printer unit power 19 and the general image processing unit power 21. After general image processing is executed on a FAX image received by the facsimile apparatus 7, the processed FAX image is printed.

(FAX Transfer Processing)

The CPU 34 turns on only the general image processing unit power 21. After general image processing is executed on data received by the facsimile apparatus 7, the processed data is transferred.

(FAX Memory Reception Processing)

The CPU 34 turns on only the general image processing unit power 21. After general image processing is executed on data received by the facsimile apparatus 7, the processed data is stored in the HDD device 6.

(FAX Transmission Processing)

The CPU 34 turns on the scanner unit power 20 and the general image processing unit power 21, so that FAX image data read by the scanner apparatus 2 is transmitted to a public line.

When the job is completed, the power supply to the device is turned off. This enables only the devices needed for the job to be in energized state only when the device is used, thereby reducing the power consumed during the standby state.

Next, determination processing for a job priority order in the image forming apparatus 1 is described.

(Print Priority Order Setting)

The controller 3 can concurrently execute a plurality of jobs and processing. However, if contention occurs in a device, the controller 3 needs to successively execute each of the jobs and processing.

For example, in a case where a PDL print job for outputting an image occurs while a read image data of an image copying job is being printed, contention occurs in an image output apparatus.

The controller 3 performs interrupt control for the PDL print job according to a print priority order of user setting values.

For example, in a case where a user has set a PDL print job to have priority beforehand, the controller 3 temporarily interrupts the print job of the image copying job to execute the PDL image output job.

In a case where jobs have the same priority order, the job activated by the operation unit 5 should be prioritized since an operator of the job activated by the operation unit 5 is likely to be in front of the image forming apparatus 1.

(Scan Priority Order Setting)

A multifunction peripheral (MFP) executes a scan operation by reading documents one by one. Accordingly, the operator is in front of the MFP and predominantly uses the scanning apparatus. This prevents contention within the apparatus of the MFP.

However, in a case where a plurality of copies is set to be output using the image copy function, the scanner apparatus reads an image only once, but there is an output standby time. In such a case, after the scanner apparatus 2 is used, the scanner apparatus 2 can receive a next image reading job.

Therefore, even in a case where the MFP is executing another job, such as an image output, the MFP can receive a job that uses the scanner apparatus 2 if the scanner apparatus 2 is in a usable state.

Figure 2:
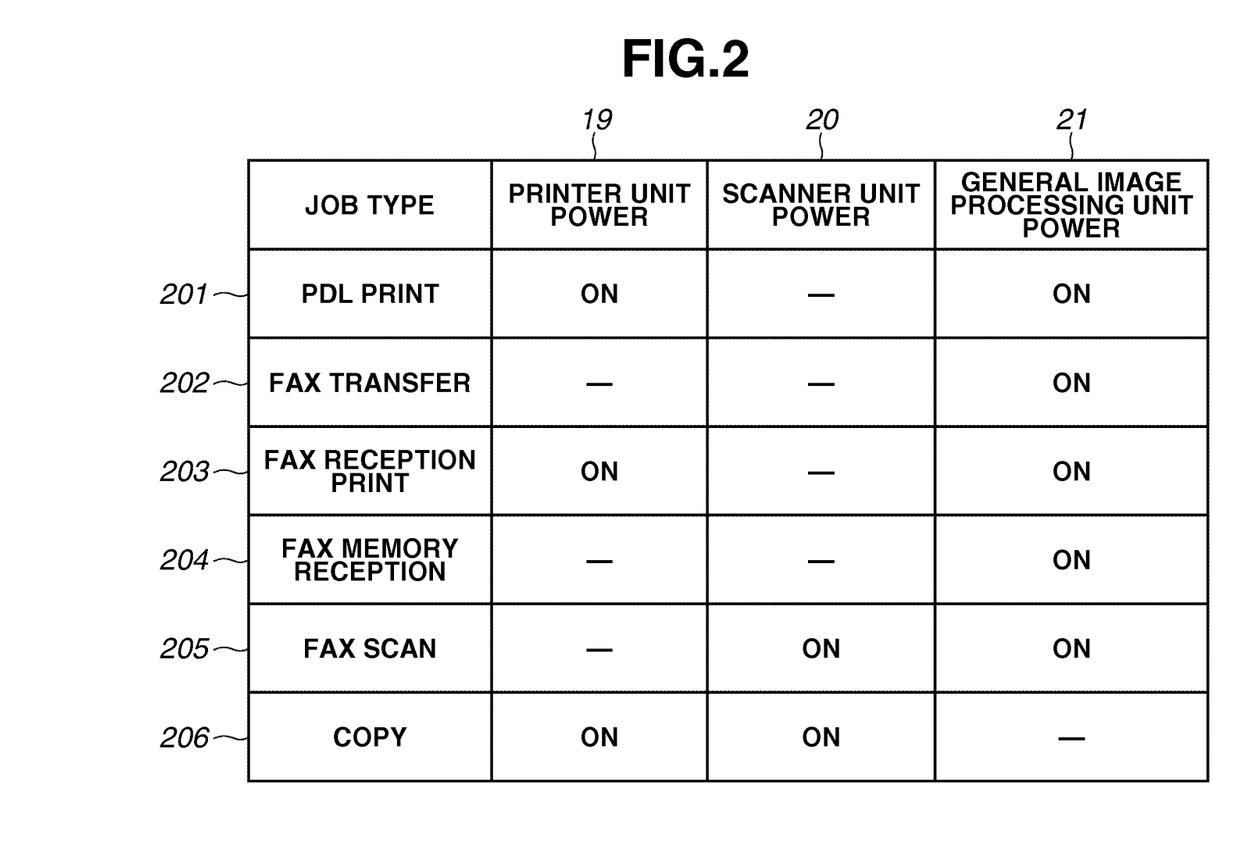
FIG. 2 is a table illustrating energization management specifications for the image forming apparatus illustrated in FIG. 1.

FIG. 2 is a table illustrating energization management specifications in the image forming apparatus 1 illustrated in FIG. 1. The table according to the present exemplary embodiment indicates a relationship among a job type, an input device, and a unit in need of a power supply. This relationship is referred to by the CPU 34. According to the present exemplary embodiment, the table stores a power state of each processing unit according to a job type to be requested, and is stored in the HDD device 6 illustrated in FIG. 1.

In FIG. 2, a PDL print 201 serving as a job type includes a specification in which data is input from a network, and power needs to be supplied to the controller unit power 18, the printer unit power 19, and the general image processing unit power 21. When a job corresponding to the PDL print 201 is received, the CPU 34 refers to this row, and controls energization for the devices in need of power. When the job is completed, the CPU 34 turns off the power that is not needed for a next job.

Similarly, a FAX transfer 202 serves as a job type. For the FAX transfer 202, the controller unit power 18 and the general image processing unit power 21 need to be energized. Similarly, a FAX reception print processing 203 serves as a print job. The row of the FAX reception print processing 203 indicates that the controller unit power 18, the printer unit power 19, and the general image processing unit power 21 need to be energized.

The energization management specifications illustrated in FIG. 2 include six job types for the sake of simplicity. There are a larger number of job types in practice.

In the present exemplary embodiment, since an energization device and a job are generally correlated, the specification of the energization device is provided for each job for the sake of description.

The ON/OFF of power may be controlled for an interface such as a network. In such a case, the ON/OFF of power needs to be controlled as necessary according to the presence or absence of service or even specific processing which is an internal non-job instead of the presence or absence of a job.

In the present exemplary embodiment, that is, a job is described as a job type. However, a type of processing which is smaller unit than the job may be used. In such a case, an energization management specification as illustrated in FIG. 2 can be formed for each processing type, so that the present invention can be applied.

The jobs of the PDL print 201, the FAX transfer 202, and the FAX reception print 203 may be input in this order in a short time. A job list of such a case is illustrated in FIG. 3.

Figure 3:
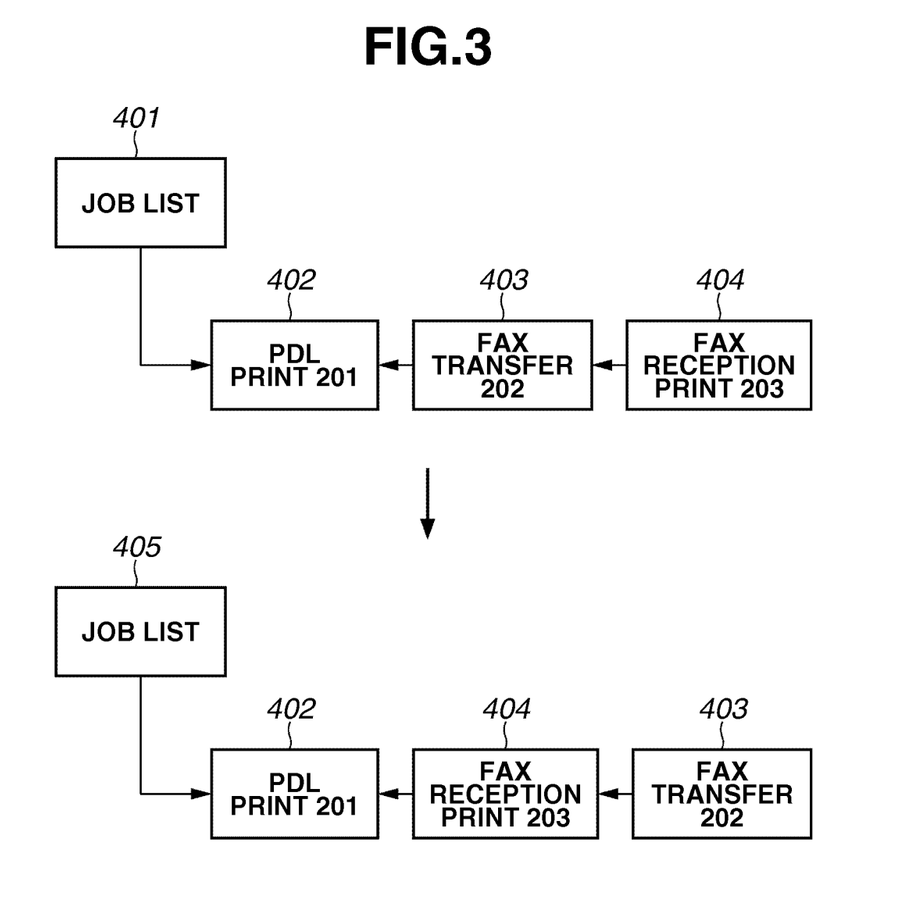
FIG. 3 is a diagram illustrating an example of lists of jobs received by the image forming apparatus.

FIG. 3 is a diagram illustrating an example of a list of the jobs received by the image forming apparatus 1 according to the present exemplary embodiment. This diagram illustrates an example, and a combination of the jobs is not limited to the example.

In FIG. 3, a job list 401 is first connected to a job 402. This indicates that a job corresponding to the PDL print 201 is input. A next job to be executed is a job 403, that is, a job corresponding to the FAX transfer 202 is input. Subsequent to the job 403, a job 404 should be executed, that is, a job corresponding to the FAX reception print 203 is input.

The job list has a queue configuration. When the job 402 is completed, the job 402 is deleted from the job list 401, and the job 403 is connected to the job list 401. Accordingly, processing is successively executed.

In a case where there is no contention in the device to be used for received jobs, a plurality of jobs can be concurrently executed. In this example case, however, the plurality of jobs cannot be executed concurrently.

For example, the printer apparatus 4 is used for both of the PDL print 201 and the FAX reception print 203, whereas the printer apparatus 4 is not used for the FAX transfer 202. Meanwhile, the general image processing unit 35 is used for both of the FAX transfer 202 and the FAX reception print 203. Consequently, the FAX transfer 202 and the FAX reception print 203 cannot be executed simultaneously.

Therefore, these jobs cannot be rearranged by the above-described print priority order setting which only determines a priority order of printing.

Consequently, these jobs are processed in the order of reception. After the job 402 is executed, the job 403 and the job 404 are executed in order.

Figure 4:
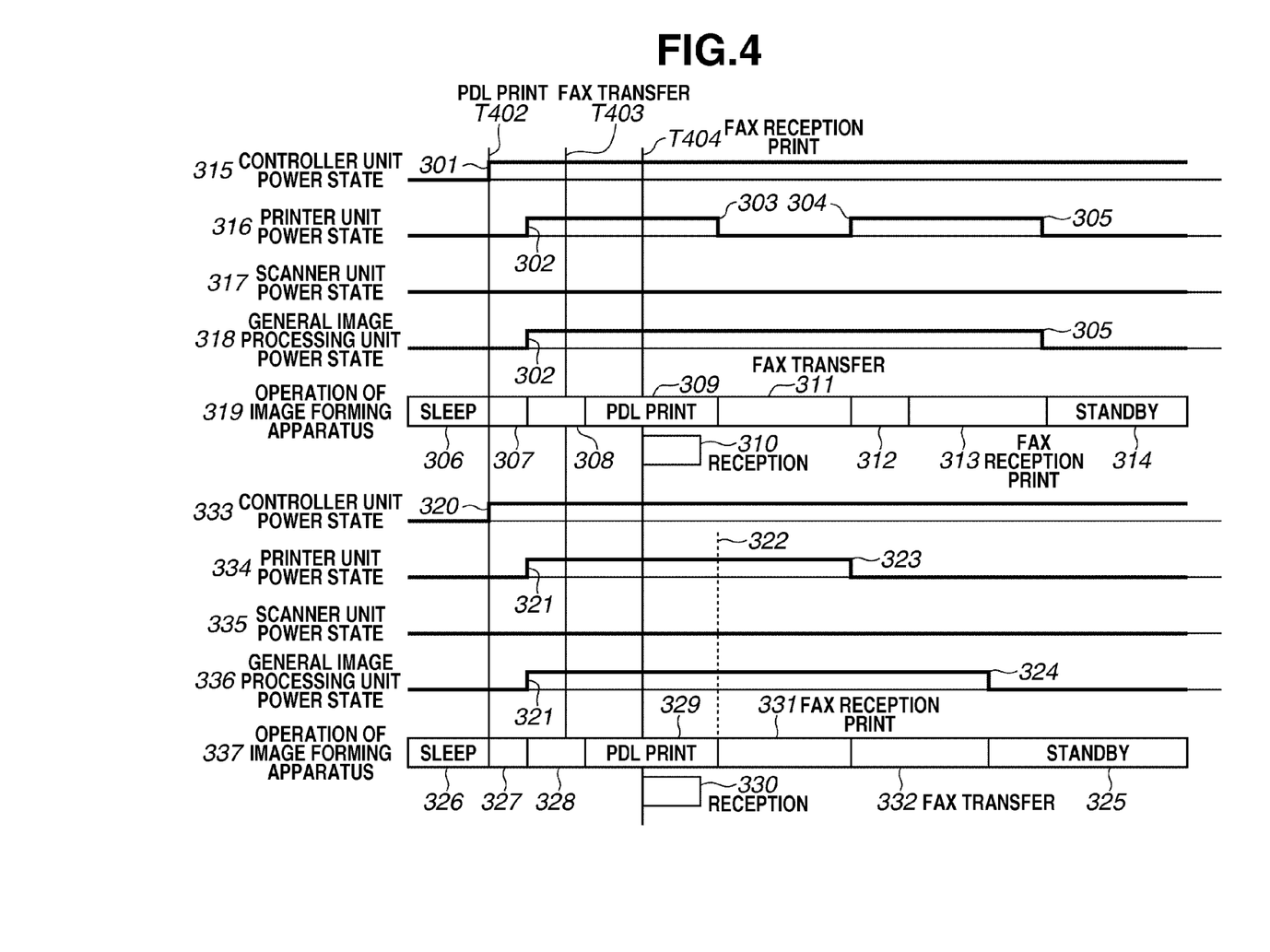
FIG. 4 is a timing chart illustrating a power state of each device of the image forming apparatus.

FIG. 4 is a timing chart illustrating a power state of each device of the image forming apparatus 1 according to the present exemplary embodiment. An upper side of the chart illustrates timing to which the present exemplary embodiment is not applied, whereas a lower side of the chart illustrates timing to which the present exemplary embodiment is applied. Processing based on the timing illustrated in the upper side of FIG. 4 is described. In FIG. 4, each of controller unit power states 315 and 333 and printer unit power states 316 and 334 indicates a power state of a corresponding device. Each of scanner unit power states 317 and 335 and general image processing unit power states 318 and 336 indicates a power state of a corresponding device. Each of operations 319 and 337 indicates an operation state of the image forming apparatus 1.

A horizontal axis indicates a time t. At timing T402, the PDL print 201 occurs. Subsequently, the FAX transfer 202 and the FAX reception print 203 are generated at timing T403 and T404, respectively.

Each of the controller unit power state 315, the printer unit power state 316, the scanner unit power state 317, and the general image processing unit power state 318 is expressed by using binary values of High and Low. The High indicates an energized state, and the Low indicates a non-energized state.

Each of the operations 319 and 337 indicates what job is currently processed by the image forming apparatus 1.

According to the operation 319 of the image forming apparatus 1, an initial state is a sleep state (standby state) 306. Subsequently, when the PDL print 201 occurs at timing T402, the controller unit power state 315 is turned on at timing 301 by hardware. The CPU 34 returns to a state that is prior to the sleep state in an operation state 307 of the image forming apparatus 1. Then, the job of the PDL print 201 received at timing T402 is analyzed. According to the table illustrated in FIG. 2, the printer unit power 19 and the general image processing unit power 21 need to be energized to execute the PDL print 201. However, the printer unit power 19 and the general image processing unit power 21 are not currently in the energized state. The CPU 34 turns on power supplies to both of the printer unit power 19 and the general image processing unit power 21 at timing 302.

The image forming apparatus 1 performs initialization processing, and accordingly, the CPU 34 awaits the initialization of the printer apparatus 4 during a period of an operation state 308. When the printer apparatus 4 notifies of completion of the initialization, the image forming apparatus 1 outputs an image during a period of an operation state 309.

Meanwhile, assume that a job of the FAX transfer 202 and a job of the FAX reception print 203 successively occur at respective timings T403 and T404. In the FAX reception print 203 at timing T404, FAX reception processing and image output processing are concurrently executed in an operation state 310, and a printing operation becomes a wait state.

When three jobs are overlapped, the jobs 402, 403, and 404 should be executed in this order according to the job queue described with reference FIG. 3. As described above, since there is no job that interrupts other jobs according to the job priority order, the jobs 402, 403, and 404 are determined to be successively executed.

In the operation state 309, the image forming apparatus 1 completes image output processing for the PDL print 201 by using the printer apparatus 4. Upon completion of processing of the job 402, the image forming apparatus 1 deletes the job 402 from the job list 401, and executes the job 403.

According to the table illustrated in FIG. 2, the job 403 is the FAX transfer 202. Since the general image processing unit 35 is used for the job 403, the general image processing unit 35 continues to be in the energized state as illustrated in the general image processing unit power state 318. Moreover, since the printer apparatus 4 is not used for the job 403 as illustrated in the printer unit power state 316 in FIG. 4, a power supply to the printer unit power state 316 is turned off at timing 303 after the image is output in the operation state 309. The image forming apparatus 1 executes FAX transfer processing in the operation state 311, and completes the job 403.

Accordingly, the job 403 is deleted from the job list 401, and the job 404 is successively executed. According to the table illustrated in FIG. 2, the printer unit power 19 is again energized at timing 304, and the image forming apparatus 1 awaits initialization of the printer apparatus 4 in an operation state 312. Subsequently, the image forming apparatus 1 prints the FAX image received in the operation state 310 by using the printer apparatus 4.

Accordingly, all the jobs are completed, and the power of each of the printer unit power states 316 and the general image processing unit power state 318 is turned off at timing 305. Consequently, the controller unit power state 315 is only in the energized state. In such a conventional operation, the printer unit power 19 is turned on and off twice. In addition, the image forming apparatus 1 awaits the initialization of the printer apparatus 4 twice in the operation states 308 and 312.

Particularly, the operation state 312 of the image forming apparatus 1 is a waiting time during which the power is wasted. Moreover, the printer unit power 19 may have the predetermined number of ON/OFF times of power supply. In such a case, the number of ON/OFF times can be increased unnecessarily.

Such a power state may be prevented by a method for maintaining the printer unit power 19 such that the printer unit power state 316 is not shifted to an off state in a period between the timing 303 and 304. However, this method allows units to be in an energized state unnecessary during execution of the job of the FAX transfer 202 in the operation state 311. Such an unnecessary energizing state is not suitable from a standpoint of power consumption.

Figure 5:
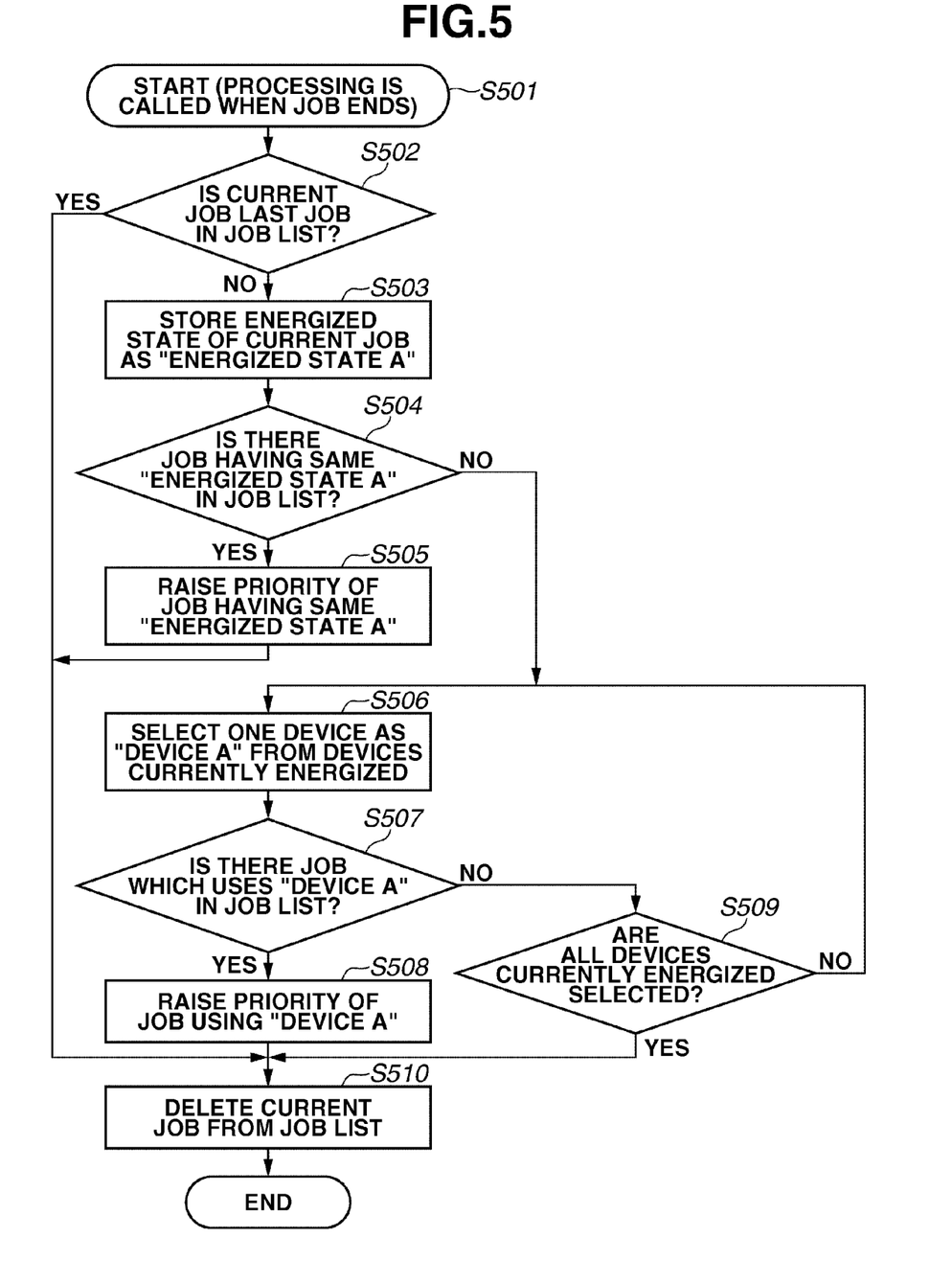
FIG. 5 is a flowchart illustrating a control method for the image forming apparatus.

In the present exemplary embodiment, therefore, the image forming apparatus 1 is controlled based on a procedure illustrated in a flowchart of FIG. 5.

FIG. 5 illustrates a control method of the image forming apparatus 1 according to the present exemplary embodiment. According to the present exemplary embodiment, when a job in execution is to be completed, the CPU 34 determines whether an execution-waiting job having the same energization specification as the job currently executed is accumulated, and controls a job order. In the processing of the flowchart illustrated in FIG. 5, the CPU 34 loads a control program stored in the HDD device 6 to the memory 33, and executes the loaded control program. The flow chart illustrated in FIG. 5 is described by referring to the lower side of the timing chart illustrated in FIG. 4 as appropriate. The image forming apparatus 1 using an information processing apparatus according to the present exemplary embodiment can operate in a normal power mode and a power-saving mode. When the image forming apparatus 1 is in the power saving mode, the CPU 34 controls a priority order of jobs according to the present exemplary embodiment. On the other hand, when the image forming apparatus 1 is in the normal power mode, the CPU 34 executes jobs in order of input. This processing illustrated in FIG. 5 is called when the CPU 34 finishes a job (every time the CPU 34 finishes a job).

According to the operation 337 illustrated in FIG. 4, the image forming apparatus 1 is in an initial state of a sleep state indicated by an operation state 326. When a job corresponding to the PDL print 201 occurs at timing T402, hardware is turned on at timing 320, and the image forming apparatus 1 is shifted to a state that is prior to the sleep state in an operation state 327.

At timing 321, the CPU 34 turns on the power necessary to execute the job received at timing T402. The image forming apparatus 1 awaits initialization of the printer apparatus 4 in an operation state 328, and executes a job of the PDL print 201 in an operation state 329.

Meanwhile, a job corresponding to the FAX transfer 202 and a job corresponding to the FAX reception print 203 are generated at respective timings T403 and T404 as similar to the above case. The job corresponding to the FAX reception print 203 occurring at timing T404 is concurrently executed in an operation state 330.

As described above, when the job of the PDL print 201 is finished in the operation state 329, a job execution order is indicated in the job list 401 illustrated in FIG. 3. That is, the job 403 and the job 404 that cannot be executed concurrently with the current job 402 are reserved.

These operations are similar to the conventional operations described above. In the conventional operations, the job 402 is deleted, and then the job 403 is executed. In the present exemplary embodiment, however, the CPU 34 executes a control procedure illustrated in FIG. 5 before the job 402 is deleted. In step S501, the control processing is called when the job 402 ends.

In step S502, the CPU 34 determines whether the current job 402 is a last job in the job list 401. Specifically, the CPU 34 determines, based on the job list 401, whether there is a job reserved to be executed subsequent to the current job 402. If the CPU 34 determines that there are the jobs 403 and 404 in the job list 401 (NO in step S502), the processing proceeds to step S503. On the other hand, if the CPU 34 determines that there is no job (YES in step S502), the operation proceeds to step S510. In step S510, the CPU 34 finishes the current job 402, and the processing ends.

In step S503, the CPU 34 acquires state of each hardware. In the present exemplary embodiment, the CPU 34 acquires a current energized state of each of the controller unit power state 333, the printer unit power state 334, the scanner unit power state 335, and the general image processing unit power state 336 illustrated in FIG. 4 as an energized state A.

Since a single job of the PDL print 201 is currently executed, the printer unit power 19 and the general image processing unit power 21 are in the energized state. Such states are acquired as the energized state A.

In step S504, the CPU 34 determines whether there is a current reserved job having the same energization specification as the energized state A in the job list 401. The CPU 34 makes such a determination based on the energization management specification table illustrated in FIG. 2. That is, the CPU 34 determines whether the job 403 and the job 404 have the energized state A. Since the reserved job types are the FAX transfer 202 and the FAX reception print 203, the CPU 34 determines that an energized state of the FAX reception print 203 has the energized state A.

In step S505, the CPU 34 raises a priority of the job 404 storing a job type of the FAX reception print 203 having the same energized state A. Specifically, the CPU 34 rearranges a job order such that the job 404 is executed subsequent to the job 402. After rearrangement of the job order, the job list 401 becomes a job list 405 illustrated in a lower portion of FIG. 3. The job 404 and the job 403 are connected in order after the current job 402. Subsequently, in step S510, the CPU 34 finishes the current job 402, and deletes the job 402 from the job list 405. Then, the processing ends.

Therefore, the CPU 34 rearranges the job execution order on the job list, so that the energized state of each unit is controlled when the FAX reception print 203 is executed in an operation state 331 after the job in the operation state 329 is completed.

Accordingly, the power supply of the printer unit power 19 is not necessarily turned off at timing 322, and the FAX data received in the operation state 330 can be printed in the operation state 331.

In the operation state 331, when the job of the FAX reception print 203 is completed, the CPU 34 evaluates the rearranged job order by calling step S501 again. Subsequently, the image forming apparatus 1 executes a job in an operation state 332, and is shifted to a standby state in an operation state 325.

The processing proceeds up to step S504 as similar to the above description. However, since only the job 403 is in the job list 405 after the current job 404 (NO in step S504), the processing proceeds to step S506. In step S506, the CPU 34 controls the job order based on energized states of the devices that partially match each other instead of completely match each other.

In step S506, the CPU 34 selects one device as a device A from the devices currently in an energized state. The CPU 34 preferentially selects a device that needs to reduce the number of ON/OFF times, and a device that requires a longer initialization time, thereby further enhancing an effect of the present invention.

Specifically, the device using the printer unit power 19 has the predetermined small number of ON/OFF times, and requires the longest initialization time. Thus, the printer unit power 19 is arranged on the leftmost side in the specification table illustrated in FIG. 2. On the other hand, the device using the general image processing unit power 21 does not have the predetermined number of ON/OFF times made by a semiconductor switch, and requires a short initialization time. Thus, the general image processing unit power 21 is arranged on the rightmost side of the table.

That is, the CPU 34 selects devices one by one from the left side to the right side in the table illustrated in FIG. 2. This configuration further enhances effects of the present invention from standpoints of the predetermined number of ON/OFF times and the power consumption. According to such a hardware configuration, further enhanced effects can be obtained by providing the energization management specifications illustrated in FIG. 2.

In step S507, the CPU 34 determines whether there is a job which uses the device A in the current job list. Since the job currently executed is the job 404 of the job list 405, the CPU 34 refers to the job 403. If the CPU 34 determines that there is no job which uses the device A in the job list 405 (NO in step S507), then in step S509, the CPU 34 determines whether all devices currently in the energized state are selected. That is, the CPU 34 checks the hardware one by one from the left to the right in the table illustrated in FIG. 2, and selects any of the processing units to which the power is currently supplied.

In FIG. 2, since the printer unit power 19 is arranged on the leftmost side, the CPU 34 searches for a job causing the printer unit power 19 to be turned on from the job list 405. However, since the job 403 does not use the printer unit power 19, the processing repeats steps S509 and S506. The arrangement on the leftmost side indicates that a processing unit has the predetermined small number of ON/OFF times. The number of ON/OFF times is predetermined in each processing unit. The processing units are selected in order from the leftmost side in step S506.

Next, the CPU 34 performs evaluation for the scanner unit power 20. However, a job corresponding to such evaluation is not found in the job list 405. The processing repeats twice, then in step S506, the job 403 of the job list 405 matches for the general image processing unit power 21. Subsequently, the processing proceeds to step S507. Since the CPU 34 determines that there is a job which uses the device A in the job list 405 (YES in step S507), then in step S508, the CPU 34 raises the priority order of the job using the device A.

When the job 404 of the job list 405 is finished, the CPU 34 determines to raise the priority of the job 403 to maintain the energized state of the general image processing unit power 21. For example, in a case where there is another job between the job 404 and the job 403, the job 403 is prioritized.

Lastly, in step S510, the CPU 34 deletes the current job 404 of the job list 405, and the processing ends. Then, the CPU 34 executes the job 403.

The above described sorting method is generally similar to a bubble sort, and arranges jobs according to a priority table as illustrated in FIG. 2. Such an arrangement enables a device that needs to reduce the number of ON/OFF times to be controlled so that the device is continuously energized as long as possible.

In FIG. 4, when the job in the operation state 331 is completed, the CPU 34 makes the above determination, so that a next job to be executed is the job 403 of the job list 405. The job 403 is the FAX transfer 202. Since energization of the printer unit power 19 is not necessary, the CPU 34 turns off the printer unit power 19 at timing 323, and executes the FAX transfer job in an operation state 332.

After completion of the job in the operation state 332, the CPU 34 executes the processing illustrated in FIG. 5 in a similar manner. However, the processing proceeds from step S502 to step S510. In step S510, the CPU 34 turns off the general image processing unit power 336, which becomes unnecessary upon completion of the current job, at timing 324. Then, the image forming apparatus 1 is shifted to standby in the operation state 325.

The present exemplary embodiment has been described by using a combination of the first control example and the second control example. In the first control example, the CPU 34 raises a priority order of any of the jobs determined to have the same power state as the job currently executed. In the second control example, the CPU 34 raises a priority order of the job using the selected processing unit, which is used by the job currently executed. However, these two controls can be executed as a series of processing or two independent processing as necessary according to a specification of the information processing apparatus.

According to the present exemplary embodiment, processing is rearranged to minimize the number of ON/OFF times of a power supply to a device, thereby reducing the number of ON/OFF times of the image forming apparatus 1. Moreover, a decrease in frequency of initialization of the image forming apparatus 1 can enhance power saving and user response speed.

The present exemplary embodiment can be performed by executing software (a program) acquired via a network or various storage media by a processing device (CPU, processor) such as a personal computer (computer).

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-034920 filed Feb. 25, 2013, which is hereby incorporated by reference herein in its entirety.

What is claimed is:

1. An information processing apparatus comprising:
a plurality of processing units configured to perform different types of processing;
a power supply unit configured to supply power to any of the processing units;
a job storage unit configured to store a first job, a second job, which is received after the first job, and a third job, which is received after the second job; and
a control unit configured to perform control, when a job waiting to be executed has the same enerigization specification as a job currently being executed, if the second job is not executable and the third job is executable in a power state to be shifted for executing the first job, to execute the third job after the first job and to execute the second job after the third job.

2. The information processing apparatus according to claim 1, further comprising:
a selection unit configured to select, if both of the second job and the third job are not executable in a power state to be shifted for executing the first job, at least one processing unit among the plurality of processing units to which power is supplied in the power state, wherein the control unit performs control, if the second job is not executable and the third job is executable in a power state in which power is supplied to the selected processing unit, to execute the third job after the first job and to execute the second job after the third job.

3. The information processing apparatus according to claim 2, wherein the selection unit configured to select the processing unit among the plurality of the processing units based on an initialization time of each of the plurality of the processing units.

4. The information processing apparatus according to claim 2, wherein the selection unit configured to select the processing unit among the plurality of the processing units based on a number of ON/OFF times of each of the plurality of the processing units.

5. The information processing apparatus according to claim 1, wherein the plurality of processing units includes a print unit, a scanner unit, and an image processing unit.

6. The information processing apparatus according to claim 1, wherein the information processing apparatus is configured to operate in a normal power mode and a power-saving mode, and wherein the control unit configured to perform control to execute the third job after the first job and to execute the second job after the third job when being in the power-saving mode, and to perform control to execute jobs in order of input when being in the normal power mode.

7. A control method for an information processing apparatus including a plurality of processing units configured to perform different types of processing and a power supply unit configured to supply power to any of the processing units, the control method comprising:

storing a first job, a second job and a third job in order of reception; and performing control, when a job waiting to be executed has the same enerigization specification as a job currently being executed, if the second job is not executable and the third job is executable in a power state to be shifted for executing the first job, to execute the third job after the first job and to execute the second job after the third job.

8. The control method according to claim 7, wherein the plurality of processing units includes a print unit, a scanner unit, and an image processing unit.

9. The control method according to claim 7, wherein the information processing apparatus is configured to operate in a normal power mode and a power-saving mode, and wherein the information processing apparatus performs control to execute the third job after the first job and to execute the second job after the third job when being in the power-saving mode, and performs control to execute jobs in order of input when being in the normal power mode.

* * * * *